(12) United States Patent
Underbrink (10) Patent No.: US 6,788,655 B1
(45) Date of Patent: Sep. 7, 2004

(54) PERSONAL COMMUNICATIONS DEVICE WITH RATIO COUNTER

(75) Inventor: Paul A. Underbrink, Lake Forest, CA (US)

(73) Assignee: SiRF Technology, Inc., San Jose, CA (US)

( * ) Notice: Subject to any disclaimer, the term of this patent is extended or adjusted under 35 U.S.C. 154(b) by 0 days.

(21) Appl. No.: 09/552,469

(22) Filed: Apr. 18, 2000

(51) Int. Cl.[7] .................................................. H04J 3/06
(52) U.S. Cl. ........................ 370/324; 370/516; 370/350
(58) Field of Search .............................. 370/252, 516–8, 370/335, 342, 350, 324; 342/352, 357; 375/355, 140; 455/575

(56) References Cited

U.S. PATENT DOCUMENTS

| | | | |
|---|---|---|---|
| 3,604,911 A | 9/1971 | Schmitt ...................... 235/181 |
| 3,975,628 A | 8/1976 | Graves et al. .............. 250/199 |
| 4,426,712 A | 1/1984 | Gorski-Popiel ............. 375/96 |
| 4,445,118 A | 4/1984 | Taylor et al. ............... 343/357 |
| 4,463,357 A | 7/1984 | MacDoran .................. 343/460 |
| 4,578,678 A | 3/1986 | Hurd .......................... 343/357 |
| 4,667,203 A | 5/1987 | Counselman, III .......... 342/357 |
| 4,701,934 A | 10/1987 | Jasper .......................... 375/1 |
| 4,704,574 A | * 11/1987 | Nossen ..................... 324/76.82 |
| 4,754,465 A | 6/1988 | Trimble ........................ 375/1 |
| 4,785,463 A | 11/1988 | Janc et al. ..................... 375/1 |
| 4,809,005 A | 2/1989 | Counselman, III .......... 342/352 |
| 4,821,294 A | 4/1989 | Thomas, Jr. ................. 375/96 |
| 4,882,739 A | * 11/1989 | Potash et al. ............... 375/358 |
| 4,890,233 A | 12/1989 | Ando et al. .................. 364/457 |
| 4,894,662 A | 1/1990 | Counselman ................ 342/357 |
| 4,894,842 A | 1/1990 | Broekhoven et al. .......... 375/1 |
| 4,953,972 A | * 9/1990 | Zuk .......................... 356/4.07 |
| 4,992,720 A | 2/1991 | Hata ............................ 320/23 |
| 4,998,111 A | 3/1991 | Ma et al. ..................... 342/352 |
| 5,014,066 A | 5/1991 | Counselman, III .......... 342/352 |
| 5,018,088 A | 5/1991 | Higbie ........................ 364/574 |
| 5,036,329 A | 7/1991 | Ando ........................... 342/357 |
| 5,043,736 A | 8/1991 | Darnell et al. .............. 342/357 |
| 5,108,334 A | 4/1992 | Eschenbach et al. ........ 455/314 |
| 5,148,042 A | 9/1992 | Nakazoe ..................... 307/65 |
| 5,153,591 A | 10/1992 | Clark .......................... 341/51 |

(List continued on next page.)

FOREIGN PATENT DOCUMENTS

| | | |
|---|---|---|
| EP | 0511741 A1 | 11/1992 |
| EP | 0639901 A2 | 2/1995 |
| EP | 0511741 B1 | 11/1997 |
| EP | 0639901 A3 | 11/1998 |
| JP | 08/065205 A | 3/1996 |
| JP | 08/065205 | 3/1996 |
| WO | WO 92/13392 | 3/1992 |
| WO | WO 00/19644 | 4/2000 |

OTHER PUBLICATIONS

D.J.R. Van Nee and A.J.R.M. Coenen, "New Fast GPS Code-Acquistion Technique Using FFT," Jan. 17, 1991, *Electronics Letters*, vol. 27, No. 2.

*Primary Examiner*—Chi Pham
*Assistant Examiner*—Derrick W Ferris
(74) *Attorney, Agent, or Firm*—Shemwell Gregory & Courtney LLP (57) ABSTRACT

The invention is directed to a personal communications device with a ratio counter providing tracking transitioning edges of two clocks so as to generate a signal to initiate capture of a clock cycle count. Provisions for tracking the transitioning edges include a storage memory for storing a first and a second value selected in accordance with the principles of convergents of continued fractions. A first and second counter each responding to first and second clock signal, respectively. The first and second counter each count clock cycles of the respective clock signal. A first register for capturing the count of the first counter and a second register for capturing the count of the second counter.

26 Claims, 6 Drawing Sheets

U.S. PATENT DOCUMENTS

| | | | |
|---|---|---|---|
| 5,179,724 A | 1/1993 | Lindoff | 455/76 |
| 5,202,829 A | 4/1993 | Geier | 364/449 |
| 5,225,842 A | 7/1993 | Brown et al. | 342/357 |
| 5,253,268 A | 10/1993 | Omura et al. | 375/1 |
| 5,276,765 A | 1/1994 | Fremman et al. | 395/2 |
| 5,293,170 A | 3/1994 | Lorenz et al. | 376/309 |
| 5,293,398 A | 3/1994 | Hamao et al. | 375/1 |
| 5,297,097 A | 3/1994 | Etoh et al. | 365/226 |
| 5,311,195 A | 5/1994 | Mathis et al. | 342/357 |
| 5,323,164 A | 6/1994 | Endo | 342/357 |
| 5,343,209 A | 8/1994 | Sennott et al. | 342/357 |
| 5,345,244 A | 9/1994 | Gildea et al. | 342/357 |
| 5,347,536 A | 9/1994 | Meehan | 375/1 |
| 5,352,970 A | 10/1994 | Armstrong, II | 320/39 |
| 5,363,030 A | 11/1994 | Ford et al. | 320/13 |
| 5,378,155 A | 1/1995 | Eldridge | 434/11 |
| 5,379,224 A | 1/1995 | Brown et al. | 364/449 |
| 5,396,515 A | 3/1995 | Dixon et al. | 375/208 |
| 5,402,346 A | 3/1995 | Lion et al. | 364/436 |
| 5,402,347 A | 3/1995 | McBurney et al. | 364/443 |
| 5,410,747 A | 4/1995 | Ohmagari et al. | 455/118 |
| 5,416,712 A | 5/1995 | Geier et al. | 364/450 |
| 5,418,818 A | 5/1995 | Marchetto et al. | 375/264 |
| 5,420,593 A | 5/1995 | Niles | 342/357 |
| 5,440,313 A | 8/1995 | Osterdock et al. | 342/352 |
| 5,450,344 A | 9/1995 | Woo et al. | 364/449 |
| 5,459,855 A * | 10/1995 | Lelm | 713/400 |
| 5,498,239 A | 3/1996 | Galel et al. | 604/95 |
| 5,504,684 A | 4/1996 | Lau et al. | 364/443 |
| 5,546,445 A | 8/1996 | Dennison et al. | 379/60 |
| 5,548,613 A | 8/1996 | Kahu et al. | 375/208 |
| 5,550,811 A | 8/1996 | Kahu et al. | 370/18 |
| 5,568,473 A | 10/1996 | Hemmati | 370/18 |
| 5,577,023 A | 11/1996 | Marum et al. | 370/16 |
| 5,577,025 A | 11/1996 | Skinner, deceased et al. | 370/22 |
| 5,592,173 A | 1/1997 | Lau et al. | 342/357 |
| 5,594,453 A | 1/1997 | Rodal et al. | 342/357 |
| 5,608,722 A | 3/1997 | Miller | 370/320 |
| 5,623,485 A | 4/1997 | Bi | 370/209 |
| 5,625,668 A | 4/1997 | Loomis et al. | 379/58 |
| 5,640,429 A | 6/1997 | Michaels et al. | 375/340 |
| 5,640,431 A | 6/1997 | Bruckert et al. | 375/344 |
| 5,642,377 A | 6/1997 | Chung et al. | 375/200 |
| 5,644,591 A | 7/1997 | Sutton | 375/200 |
| 5,649,000 A | 7/1997 | Lee et al. | 455/436 |
| 5,650,792 A | 7/1997 | Moore et al. | 343/725 |
| 5,654,718 A | 8/1997 | Beason et al. | 342/357 |
| 5,663,734 A | 9/1997 | Krasner | 342/357 |
| 5,663,735 A | 9/1997 | Eshenbach | 342/357 |
| 5,689,814 A | 11/1997 | Hagisawa et al. | 455/69 |
| 5,717,403 A * | 2/1998 | Nelson et al. | 342/357.12 |
| 5,722,061 A | 2/1998 | Hutchison, IV et al. | 455/245.1 |
| 5,734,674 A | 3/1998 | Fenton et al. | 375/207 |
| 5,734,966 A | 3/1998 | Farrer et al. | 455/63 |
| 5,737,329 A | 4/1998 | Horiguchi | 370/342 |
| 5,739,596 A | 4/1998 | Takizawa et al. | 307/66 |
| 5,749,067 A | 5/1998 | Barrett | 704/233 |
| 5,781,156 A | 7/1998 | Krasner | 342/357 |
| 5,784,695 A | 7/1998 | Upton et al. | 455/442 |
| 5,786,789 A | 7/1998 | Janky | 342/357 |
| 5,812,087 A | 9/1998 | Krasner | 342/357 |
| 5,825,327 A | 10/1998 | Krasner | 342/357 |
| 5,828,694 A | 10/1998 | Schipper | 375/208 |
| 5,831,574 A | 11/1998 | Krasner | 342/357 |
| 5,832,021 A | 11/1998 | Kondo | 375/200 |
| 5,841,396 A | 11/1998 | Krasner | 342/357 |
| 5,845,203 A | 12/1998 | LaDue | 455/414 |
| 5,854,605 A | 12/1998 | Gildea | 342/357 |
| 5,862,465 A | 1/1999 | Ou | 455/234.1 |
| 5,867,535 A | 2/1999 | Phillips et al. | 375/295 |
| 5,867,795 A | 2/1999 | Novis et al. | 455/566 |
| 5,872,540 A | 2/1999 | Casabona et al. | 342/362 |
| 5,874,914 A | 2/1999 | Krasner | 342/357 |
| 5,877,724 A | 3/1999 | Davis | 342/357 |
| 5,877,725 A | 3/1999 | Kalafus | 342/357 |
| 5,881,371 A | 3/1999 | Reynolds | 455/83 |
| 5,883,594 A | 3/1999 | Lau | 342/357 |
| 5,884,214 A | 3/1999 | Krasner | 701/207 |
| 5,889,474 A | 3/1999 | LaDue | 340/825.49 |
| 5,903,654 A | 5/1999 | Milton et al. | 380/49 |
| 5,907,809 A | 5/1999 | Molnar et al. | 455/456 |
| 5,909,640 A | 6/1999 | Farrer et al. | 455/63 |
| 5,917,444 A | 6/1999 | Loomis et al. | 342/357 |
| 5,917,829 A | 6/1999 | Hertz et al. | 370/479 |
| 5,920,283 A | 7/1999 | Shaheen et al. | 342/357 |
| 5,923,703 A | 7/1999 | Pon et al. | 375/209 |
| 5,924,024 A | 7/1999 | Ikeda et al. | 455/313 |
| 5,926,131 A | 7/1999 | Sakumoto et al. | 342/357 |
| 5,936,572 A | 8/1999 | Loomis et al. | 342/357 |
| 5,943,363 A | 8/1999 | Hanson et al. | 375/206 |
| 5,945,944 A | 8/1999 | Krasner | 342/357.06 |
| 5,956,328 A | 9/1999 | Sato | 370/335 |
| 5,963,582 A | 10/1999 | Stansell, Jr. | 375/200 |
| 5,970,084 A | 10/1999 | Honda | 375/200 |
| 5,977,909 A | 11/1999 | Harrison et al. | 342/357.09 |
| 5,982,324 A | 11/1999 | Watters et al. | 342/357.06 |
| 5,987,016 A | 11/1999 | He | 370/335 |
| 5,991,309 A | 11/1999 | Jensen et al. | 370/492 |
| 5,991,613 A | 11/1999 | Euscher et al. | 455/277.1 |
| 5,995,537 A | 11/1999 | Kondo | 375/208 |
| 5,999,124 A | 12/1999 | Sheynblat | 342/357.09 |
| 6,002,362 A | 12/1999 | Gudat | 342/357.03 |
| 6,002,363 A | 12/1999 | Krasner | 342/357.1 |
| 6,002,709 A | 12/1999 | Hendrickson | 375/206 |
| 6,009,551 A | 12/1999 | Sheynblat | 714/776 |
| 6,016,119 A | 1/2000 | Krasner | 342/357.06 |
| 6,023,462 A | 2/2000 | Nieczyporowicz et al. | 370/335 |
| 6,041,222 A | 3/2000 | Horton et al. | 455/255 |
| 6,047,016 A | 4/2000 | Ramberg et al. | 375/200 |
| 6,047,017 A | 4/2000 | Cahn et al. | 375/200 |
| 6,049,715 A | 4/2000 | Willhoff et al. | 455/436 |
| 6,052,081 A | 4/2000 | Krasner | 342/357.02 |
| 6,061,018 A | 5/2000 | Sheynblat | 342/357.06 |
| 6,064,336 A | 5/2000 | Krasner | 342/357.05 |
| 6,064,688 A | 5/2000 | Yanagi | 375/149 |
| 6,075,809 A | 6/2000 | Naruse | 375/147 |
| 6,097,974 A * | 8/2000 | Camp et al. | 455/575.7 |
| 6,104,338 A | 8/2000 | Krasner | 342/357.06 |
| 6,104,340 A | 8/2000 | Krasner | 342/357.1 |
| 6,107,960 A | 8/2000 | Krasner | 342/357.09 |
| 6,111,540 A | 8/2000 | Krasner | 342/357.1 |
| 6,122,506 A * | 9/2000 | Lau et al. | 455/427 |
| 6,131,067 A | 10/2000 | Girerd et al. | 701/213 |
| 6,133,871 A | 10/2000 | Krasner | 342/357.06 |
| 6,133,873 A | 10/2000 | Krasner | 342/357.12 |
| 6,133,874 A | 10/2000 | Krasner | 342/357.15 |
| 6,137,332 A * | 10/2000 | Inoue et al. | 327/256 |
| 6,150,980 A | 11/2000 | Krasner | 342/357.1 |
| 6,219,394 B1 * | 4/2001 | Sander | 375/355 |
| 6,249,253 B1 * | 6/2001 | Nielsen et al. | 342/463 |
| 6,252,543 B1 * | 6/2001 | Camp | 342/357.06 |

\* cited by examiner

PERSONAL COMMUNICATIONS DEVICE WITH RATIO COUNTER

FIELD OF THE INVENTION

This invention is generally related to a personal communications device and, more particularly, to a system and method for determining the ratio between the frequency of two clocks within the personal communications device.

BACKGROUND OF THE INVENTION

In communications devices such as that described in U.S. Pat. No. 5,945,944 to Krasner et al. for a Method and apparatus for Determining Time For GPS Receivers, the disclosure of which is hereby incorporated herein by reference, it is common for there to be multiple clocks or oscillators that provide clock signals of varying characteristics, including frequency, to device circuitry. In order for the device to operate properly, it is often necessary for certain device operations which operate at different clock frequencies to be synchronized. In order to accomplish this it is necessary to determine the frequency at which a clock operates in relation to a known, or predetermined, reference clock. This is typically done by counting, for a predetermined and known period of time, the number of cycles of a known reference clock having a known frequency, as well as the number of cycles of a second clock of unknown frequency.

Figure 1:
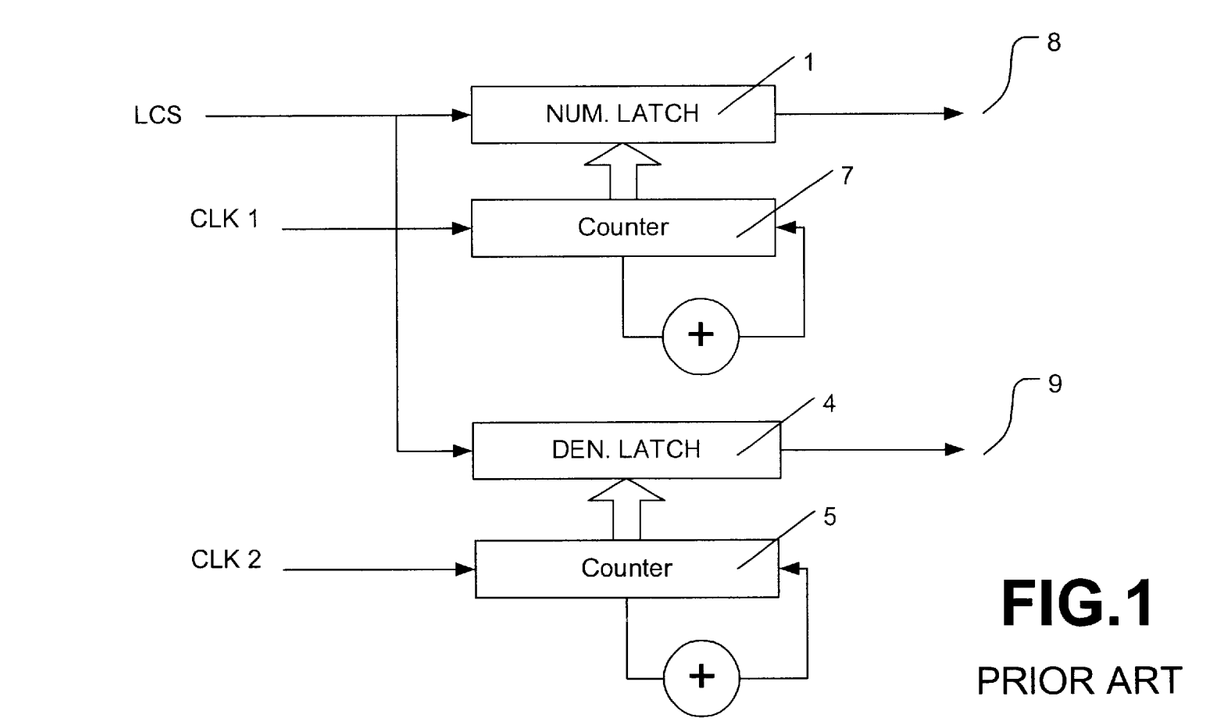
FIG. 1 is a diagram illustrating a typical system for determining a clock frequency ratio.

A typical set-up for determining a ration between two clock signals is shown in FIG. 1. With reference to FIG. 1, there is provided a numerator latch 1 for receiving and storing the contents of an incrementing counter 7 when a load count signal LCS is received by the numerator latch 1. Incrementing counter 7 is clocked by a clock signal CLK 1. With each pulse of the clock signal CLK 1 the count value of the incrementing counter 7 increases by a value of one (1). There is also provided a denominator latch 4 which, upon receiving load count signal LCS, receives and stores the contents of a incrementing counter 5. Incrementing counter 5 is clocked by a clock signal CLK 2. The value of incrementing counter 5 increases by a value of one (1) with each pulse of the clock signal CLK 2. Upon receiving the load count signal LCS, numerator latch 1 and denominator latch 4 make their respective values available for output as numerator out signal 8 and denominator out signal 9, respectively. In order to compute the ratio of the two clock signals CLK 1 and CLK 2, the values of numerator out signal 8 and denominator out signal 9, respectively. In order to compute the ratio of the two clock signals CLK 1 and CLK 2, the values of numerator out signal 8 and denominator out signal 9 can be divided to produce the ratio between clock signals CLK 1 and CLK 2.

Where, for example, the frequency of CLK 1 is known, the ratio between the value of numerator latch 1 and denominator latch 4 can be used to compute the frequency of the clock signal CLK 2. This process is typically carried out as a part of a dedicated clock pulse count operation and is only as accurate as the resolution of the counting device will allow. These known ratio-counting devices do not provide for dynamically increasing the accuracy of the count while counting of the clock cycles takes place. Thus, a need exists in the industry to address the deficiencies and inadequacies.

SUMMARY OF THE INVENTION

This invention is directed to a personal communications device with a ratio counter providing tracking transitioning edges of two clocks so as to generate a signal to initiate capture of a clock cycle count. Provisions for tracking the transitioning edges include a storage memory for storing a first and a second value selected in accordance with the principles of convergents of continued fractions. A first and second counter each responding to first and second clock signal, respectively. The first and second counter each count clock cycles of the respective clock signal. A first register for capturing the count of the first counter and a second register for capturing the count of the second counter.

This invention provides a system and method for calculating a ratio between two clock frequencies in a personal communications device. In architecture, the system may be implemented by a first receiver that includes a first clock generating a first clock signal for clocking the first receiver; a second receiver that includes a second clock generating a second clock signal for clocking the second receiver; and a frequency ratio counter for providing a ratio between the frequency of the first clock signal and the frequency of the second clock signal.

The invention can also be viewed as providing a method for determining a ratio between the frequencies of two clocks. In this regard, the method can be broadly summarized by the following steps: counting successive clock pulses of a fist clock signal for a duration of time determined in accordance with a control signal, counting successive clock pulses of a second clock signal for the duration of time, reading the count of the clock pulses of the first clock signal upon the elapse of the duration; and reading the count of the clock pulses of the second clock signal upon the elapse of the duration. In this method, the control signal is generated where a transitioning pulse edge of the first clock coincides and is in synchronization with a transitioning pulse edge of the second clock.

Other systems, methods, features, and advantages of the invention will be or become apparent to one with skill in the art upon examination of the following figures and detailed description. It is intended that all such additional systems, methods, features, and advantages be included within this description, be within the scope of the invention, and be protected by the accompanying claims.

BRIEF DESCRIPTION OF THE FIGURES

The invention can be better understood with reference to the following figures. The components in the figures are not necessarily to scale, emphasis instead being placed upon clearly illustrating the principles of the invention. Moreover, in the figures, like reference numerals designate corresponding parts throughout the several views.

DETAILED DESCRIPTION OF THE PREFERRED EMBODIMENT

Figure 2:
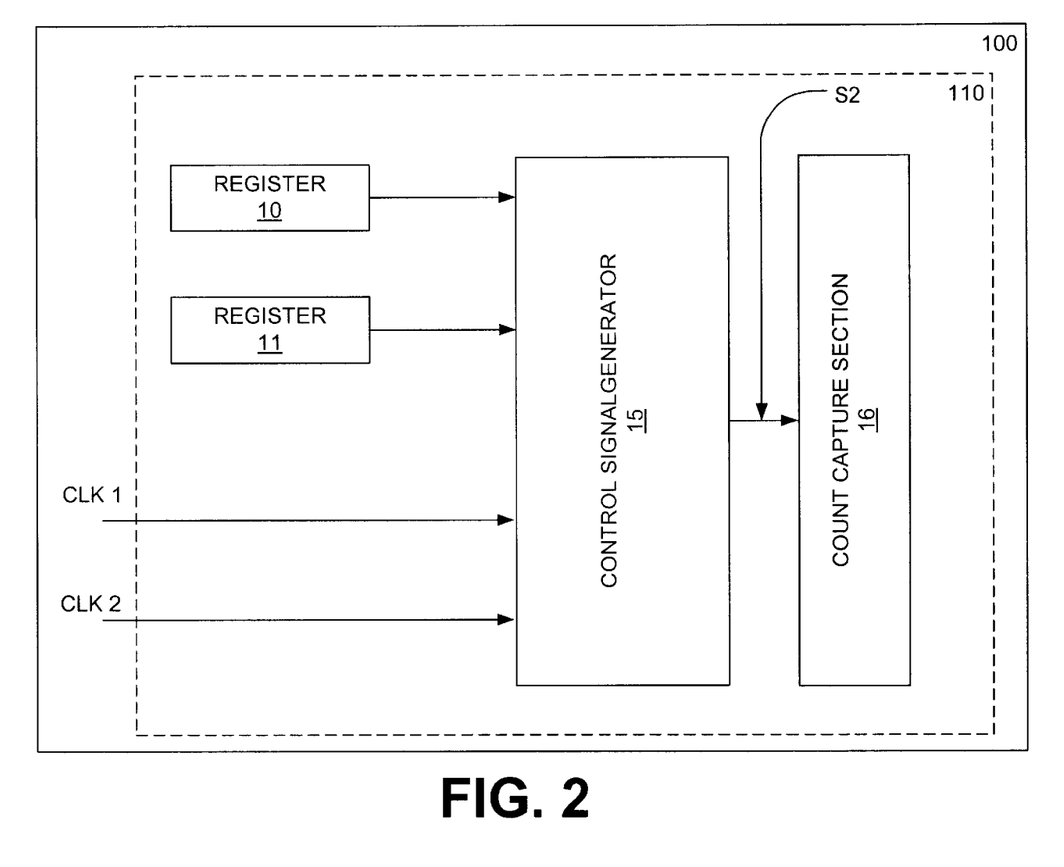
FIG. 2 is a diagram illustrating a personal communications device according to the invention.

With reference to FIG. 2, a general description of a personal communications device 100 with ratio counter provisions according to the invention is illustrated. Clock ratio counter 110 includes a register 10 and a register 11. There is also provided a control signal generator 15 that alternately selects and receives an input value from register 10 and register 11 as well as an input of a clock signal CLK 1 from a clock under examination. This may be, for example, a clock signal from the clock signal source (clock) of a telecommunications receiver. A second clock signal CLK 2 is received from a second clock source under evaluation. CLK 2 may be, for example, a clock signal from a clock source of a global positioning system (GPS) receiver. The values stored in register 10 and 11 are pre-selected. The selection of these values is discussed in more detail below. Control signal generator 15 responds to these inputs by producing a control signal S2 that is provided to count capture section 16.

Figure 3:
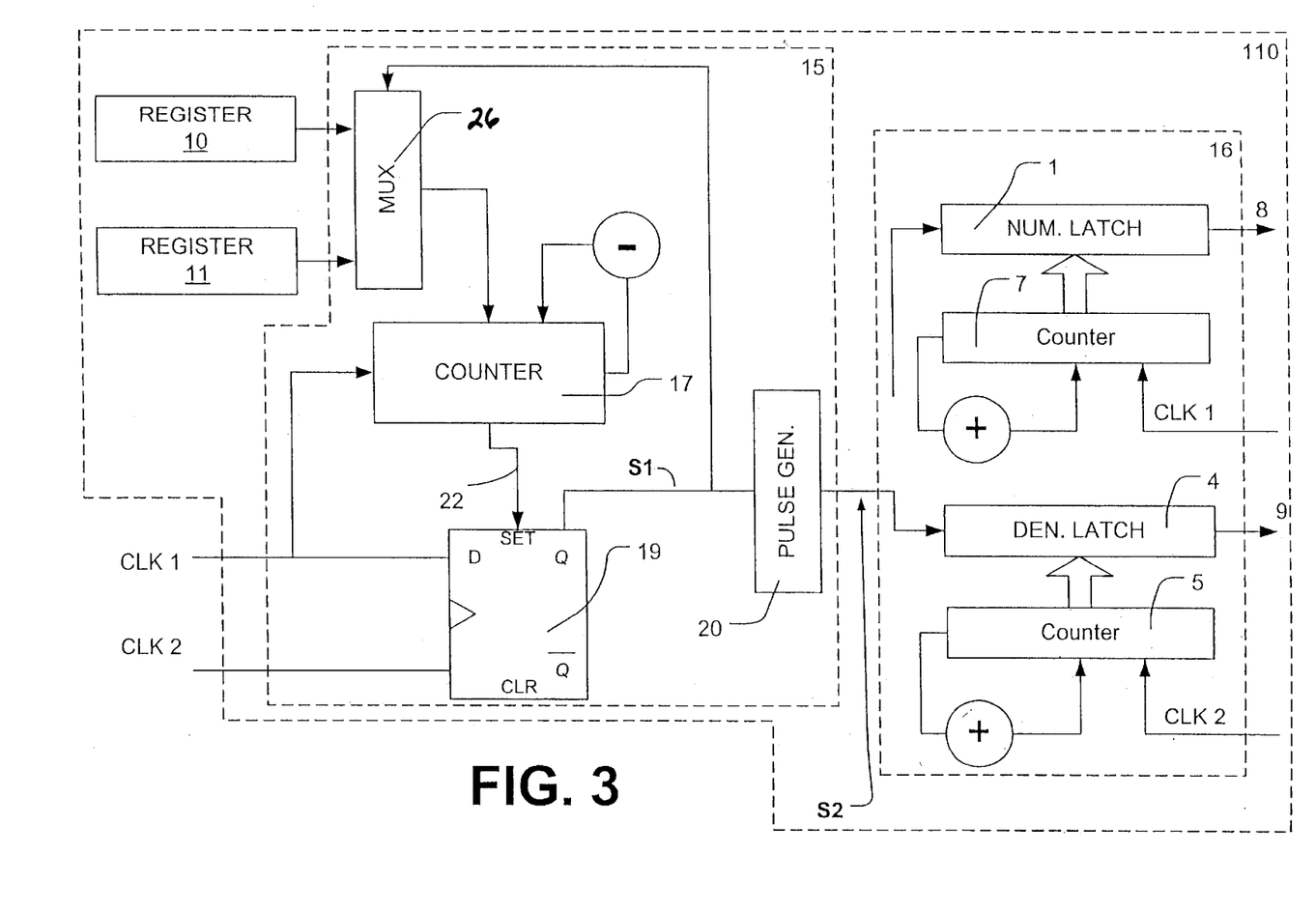
FIG. 3 is a detailed description of one embodiment of a personal communications device according to the invention.

FIG. 3 illustrates a more detailed description of an embodiment of the ration counter 110 according to the invention. It can be seen that control signal generator 15 includes multiplexer 26, a decrementing counter 17, a flip-flop 19 and a pulse generator 20. Multiplexer 26 is used to select between the input from either register 10 or register 11 in accordance with an edge transition signal S1 from flip-flop 19. Depending upon which register, 10 or 11, is selected by multiplexer 26, the contents of the selected register, 10 or 11, are input to decrementing counter 17. The value loaded into decrementing counter 17 is then decremented by one (1) for each pulse of the clock signal CLK 1. Once the contents of decrementing counter 17 have reached zero (0) value, decrementing counter 17 issues an enable signal 22 to flip-flop 19. Flip-flop 19 then outputs an edge transition signal S1, in accordance with the inputs of clock signals CLK 1 and CLK 2. The edge transitions signal S1 from flip-flop 19 is also fed to pulse generator 20. In response to edge transition output S1, pulse generator 20 generates a control signal S2. Control signal S2 is then used to enable numerator latch 1 and denominator latch 4 so as to receive the contents of incrementing counters 7 and 5, respectively. The contents of numerator latch 1 and denominator latch 4 can be read out and used to specify the ration between the frequency of clock signal CLK 1 and the frequency of clock signal CLK 2.

Figure 4:
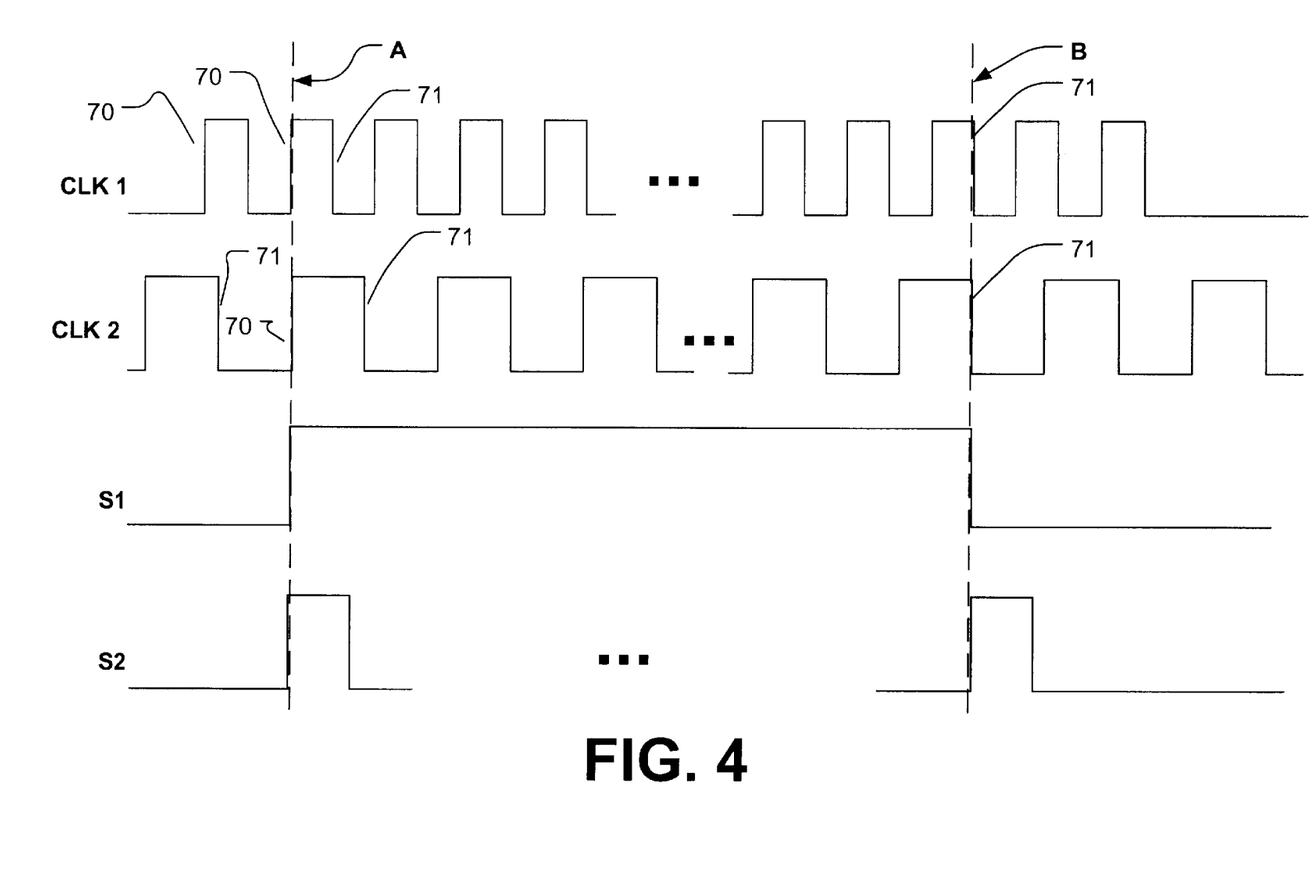
FIG. 4 is a timing diagram illustrating a relation between various clock signals and a control signal output.

FIG. 4 illustrates a relation between a clock signal CLK 1 and a clock signal CLK 2 and edge transition signal S1. Both CLK 1 and CLK 2 have a leading edge 70, and a trailing edge 71. For purposes of discussion, it will be understood that leading edge 70 and trailing edge 71 are transitioning edges. From FIG. 4 it can be seen that the instances at which clock signal CLK 1 and clock signal CLK 2 have transitioning edges which coincide and are in synchronization with each other is a reoccurring, although not constant, scenario. FIG. 4 shows that at the point A, a leading edge 70 of clock signal CLK 1 begins to transition from low to high at the same time that a leading edge 70 of clock signal CLK 2 begins to transition from low to high. In response, edge transition signal S1 from flip-flop 19 changes from low to high and a control signal S2 is generated. Similarly, at point B, a trailing edge 71 of clock signal CLK 1 begins to transition from high to low at the same time that a trailing edge 71 of clock signal CLK 2 begins to transition from high to low. In response, edge transition signal S1 from flip-flop 19 changes from high to low and control signal S2 is again generated.

Figure 5:
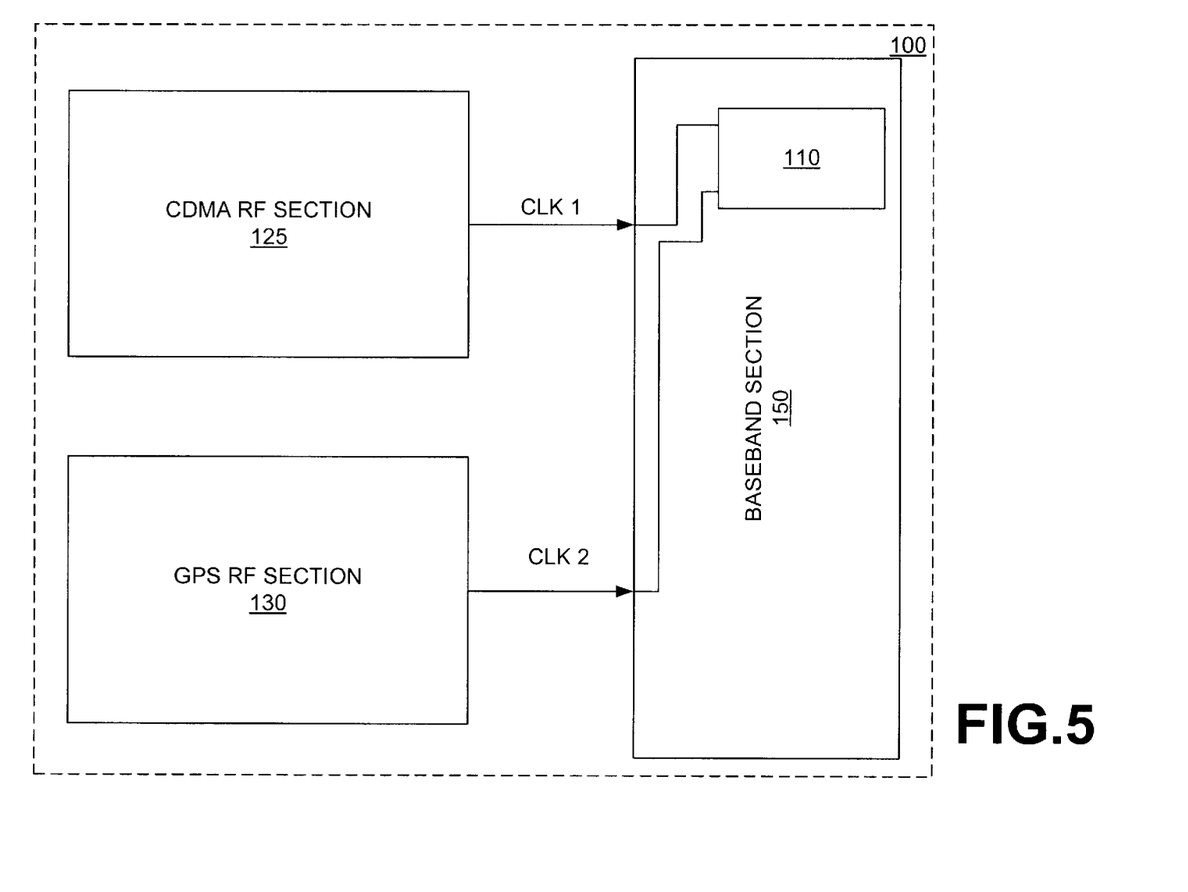
FIG. 5 is a diagram illustrating a further embodiment of the invention.

With reference to FIG. 5, a further embodiment of portable communications device 100 is illustrated. Here it can be seen that the ratio counter 110 of the invention is incorporated as a part of a baseband section 150 of portable communications device 100. There is provided a code division multiple access (CDMA) radio frequency (RF) section 125 which provides a clock signal CLK 1 to the ratio counter 110 of the baseband section 150. Further, global positioning system (GPS) radio frequency section 130 is provided which provides a second clock signal CLK 2 to the ratio counter 110 of the baseband section 150. The ratio counter output is utilized by the circuitry of the portable communications device 100 to optimize circuit operations and allow for reduced power consumption.

In personal communication device 100, information indicative of the ratio between the frequencies of the two clock signals CLK 1 and CLK 2 is generated and output for use by device circuitry. One of either register 10 or register 11 is used to store a value representing a reference clock frequency while the other of register 10 or register 11 is used to store a value representing a close approximation of the frequency of a second clock. These values are then alternately used to generate a control signal S2 for causing the count value of decrementing counters 5 and 7 to be captured and, if desired, read out. Typically, in the portable communications device 100 of FIG. 5, the clock signal CLK 1 driving the CDMA RF section 125 is relatively stable and of a known frequency. While the GPS clock signal CLK 2 driving the GPS RF section 130 is often generated by a crystal oscillator and is less stable thus, the accuracy of the frequency of CLK 2 at any given time is prone to vary. This is due to the fact that the frequency of a crystal oscillator tends to fluctuate as the temperature changes. Given this, register 11 is loaded with a value that is a close approximation of the frequency of the GPS clock signal CLK 2 is loaded into register 11 as the second value.

In a preferred embodiment of the invention, the values loaded into register 10 and register 11 are chosen in accordance with calculations based upon the principles of convergents of continued fractions. More particularly, convergents of continued fractions are used to generate a series of rational approximations to an actual ratio. These ratios are then used as the values input into in the registers 10 and register 11, respectively.

The continued fraction expansion of real number x is expressed by Equation 1 which follows.

$$a_0 + \cfrac{1}{a_1 + \cfrac{1}{a_2 + \ldots}} \quad \text{[Equation 1]}$$

Here, the integers $a_1 \ldots$ are partial quotients. Rational numbers have a finite number of partial quotients, while the rational numbers have an infinite continued fraction expansion. If the number x has partial quotients $a_0, a_1 \ldots$, the rational number $p_n/q_n$ formed by considering the first n partial quotients $a_0, a_1 \ldots$, a sub n is called the $n^{th}$ convergent of x. The convergence of that number provides a rational approximation with a small denominator to a given real number. Successive convergence will have error that oscillates positive and negative and which sequentially converges to the exact ratio between, for example, the frequency of clock signal CLK 1 and clock signal CLK 2. In view of this, continued fraction expansions are useful for selecting the values (divisors) which should be loaded into register 10 and register 11 of the invention 100.

As an example of choosing values for registers 10 and 11, where, for example, CLK 1 is a known frequency of 13 MHz and CLK 2 is believed to be approximately 10.949 MHz; possible values (columns A–H) for loading into register 10 and 11 chosen in accordance with the principles of convergents of continued fractions are shown in TABLE 1 below.

TABLE 1

|  | A | B | C | D | E | F | G | H |
|---|---|---|---|---|---|---|---|---|
| NUM | 1 | 5 | 11 | 16 | 283 | 299 | 27791 | 28090 |
| DEN | 1 | 6 | 13 | 19 | 336 | 355 | 32996 | 33351 |

With the above ratios, the value of the numerator of the ratio would be loaded into one register, register 10 for example, and the denominator would be loaded into the second register, register 11 for example. For example, the values shown for case B (Column B) in TABLE 1 above could be loaded into the registers as follows: the numerator value "5" could be loaded into register 10, while the denominator value "6" could be loaded into register 11.

Figure 6:
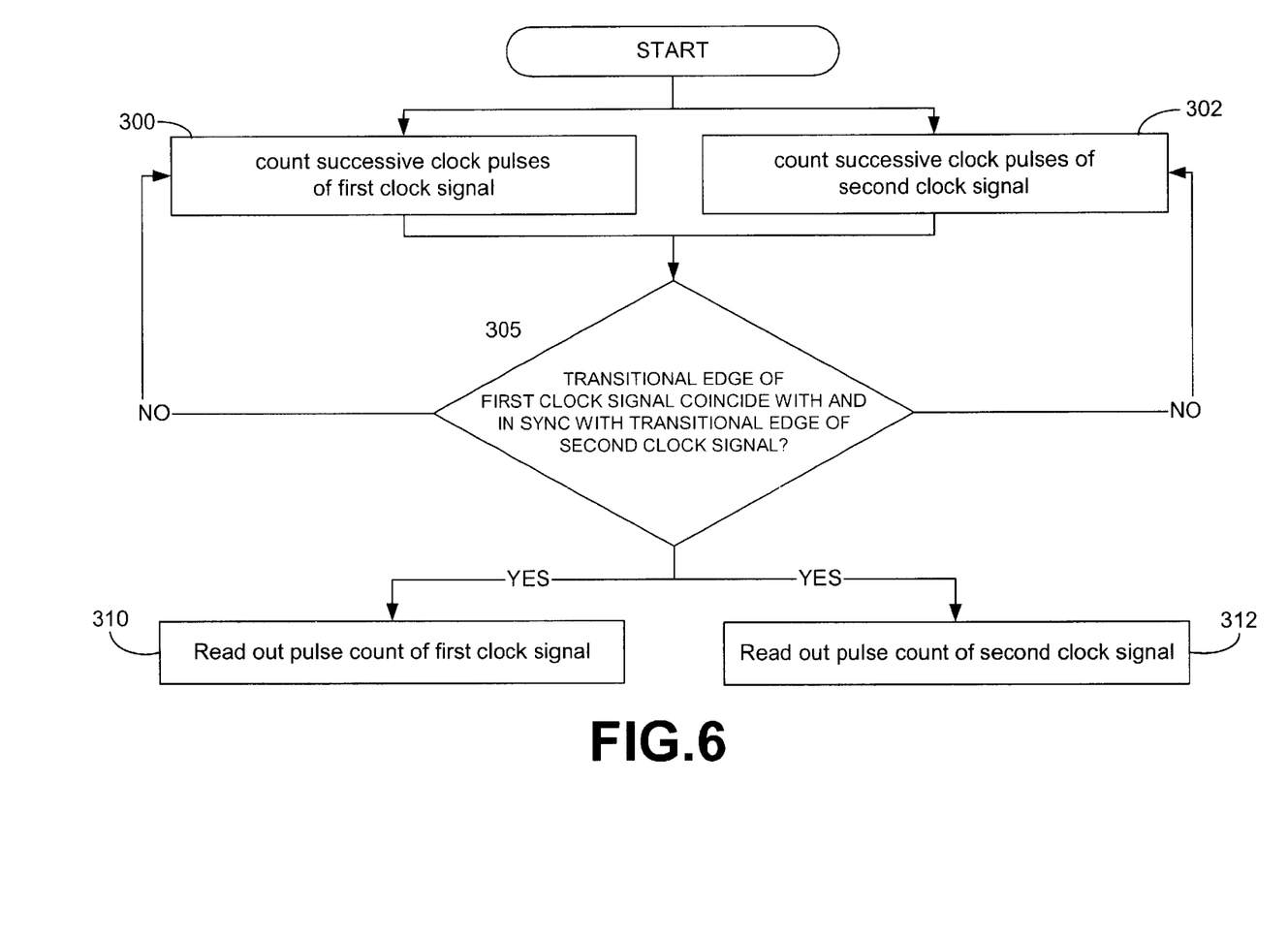
FIG. 6 is a flowchart illustrating the method of the invention.

FIG. 6 is a flowchart illustrating the method of determining a ratio between two clock frequencies of the invention. Successive clock pulses of a first clock signal are counted 300 for a predetermined duration of time and successive clock pulses of a second clock signal are counted 302 for the duration of time. It is then determined whether a transitioning edge of the first clock signal coincides with and is in synchronization with a transitioning edge of the second clock signal 305. If so, a control signal is generated which signals the elapse of the duration of time. Read out the count of clock pulses of the first clock signal 310 and the second clock signal 312 upon the elapse of the duration of time.

The ratio counter 110 of the invention can be implemented in hardware, software, firmware, or a combination thereof. In a preferred embodiment(s), the invention 100 is implemented in software or firmware that is stored in a memory and that is executed by a suitable instruction execution system. If implemented in hardware, as in an alternative embodiment, the invention 100 can implemented with any or a combination of the following technologies, which are all well known in the art: a discrete logic circuit(s) having logic gates for implementing logic functions upon data signals, an application specific integrated circuit having appropriate logic gates, a programmable gate array(s) (PGA), a fully programmable gate array (FPGA), etc.

The flow chart of FIG. 6 shows the architecture, functionality, and operation of a possible implementation of the ratio counting method of the invention in software. In this regard, each block represents a module, segment, or portion of code, which comprises one or more executable instructions for implementing the specified logical function (s). It should also be noted that in some alternative implementations, the functions noted in the blocks may occur out of the order noted in FIG. 6. For example, two blocks shown in succession in FIG. 6 may in fact be executed substantially concurrently or the blocks may sometimes be executed in the reverse order, depending upon the functionality involved, as will be further clarified hereinbelow.

It should be emphasized that the above-described embodiments of the invention, particularly, any "preferred" embodiments, are merely possible examples of implementations, merely set forth for a clear understanding of the principles of the invention. Many variations and modifications may be made to the above-described embodiment(s) of the invention without departing substantially from the spirit and principles of the invention. All such modifications and variations are intended to be included herein within the scope of this disclosure and the invention and protected by the following claims.

What is claimed is:

1. A personal communications device comprising:

first receiver comprising a first clock for generating a first clock signal;

second receiver comprising a second clock for generating a second clock signal at least one register for storing first and second values; and frequency ratio counter that receives one of the first and second values in response to the first clock signal and generates a control signal under control of the received value, counts pulses of the first clock signal and the second clock signal and captures the count of each clock signal in response to the control signal, and determines a ratio between a frequency of the first clock signal and a frequency of the second clock signal using the count.

2. A personal communications device according to claim 1, wherein the frequency ratio counter comprises:

first register for storing the first value;

second register for storing the second value;

control signal generator comprising a first input for receiving input of the value stored in the first register, a second input for receiving the value stored in the second register, third input for receiving the first clock signal, a forth input for receiving the second clock signal and an output for outputting the control signal in accordance with the value stored in the first and second register and the first and the second clock signals; and count capture unit, responsive to the control signal output from the control signal generator, for capturing values representative of the number of clock cycles of the first and the second clock signal that occur within a given time duration.

3. A personal communications device according to claim 1 wherein the first value represents an approximation of the frequency of the first clock signal.

4. A personal communications device according to claim 1 wherein the second value represents an approximation of the frequency of the second clock signal.

5. A personal communications device according to claim 1 wherein the first and second values are selected in accordance with calculations based upon the principles of convergents of continued fractions.

6. A personal communications device according to claim 2 wherein the control signal generator further comprises:

switch responsive to an edge transition signal, for selecting between the input from the first register and the input from the second register;

decrementing counter for alternately receiving the value from the first or second register and decrementing the received value in synchronization with the first clock signal and generating an enable signal when the value reaches zero;

flip-flop responsive to the enable signal for generating the edge transition signal in accordance with the first clock signal and the second clock signal; and pulse generator responsive to the edge transition signal, for outputting the control signal to the count capture unit.

7. A personal communications device according to claim 2 wherein the count capture unit further comprises:

first incrementing counter for counting the pulses of the first clock signal;

second incrementing counter for counting the pulses of the second clock signal;

first latch for storing the count value for the first incrementing counter in response to the control signal; and second latch for storing the count value of the second incrementing counter in response to the control signal.

8. A method of determining a ratio between two clock frequencies comprising:

reading one of a first value and a second value in response to a first clock signal and generating a control signal under control of the read value;

counting successive clock pulses of the first clock signal for a duration of time determined in accordance with the control signal;

counting successive clock pulses of a second clock signal for the duration of time;

reading the count of the clock pulses of each of the first clock signal and the second clock signal upon the elapse of the duration; and determining the ratio between a frequency of the first clock signal and a frequency of the second clock signal using the count.

9. A method of determining a ratio between two clock frequencies according to claim 8 wherein the first clock comprises a clock for providing clock signals to a telecommunications unit and the second clock comprises a clock for providing clock signals to a GPS receiver.

10. A method of determining a ratio between two clock frequencies according to claim 9 wherein the telecommunications unit comprises a CDMA based telecommunications unit.

11. A personal communications device having provisions for ratio counting comprising:

a first memory area for storing a first value;

a second memory area for storing a second value;

control signal generator for receiving one of the first and second values in response to a first clock signal and for outputting a control signal; and count capture unit for receiving the first clock signal and a second clock signal and counting the pulses of the first clock signal and the second clock signal and capturing the count of each clock signal in response to the control signal.

12. A personal communications device according to claim 11 further comprising:

first radio receiver; and second radio receiver.

13. A personal communications device according to claim 12 where in the first radio receiver comprises a code division multiple access (CDMA) based receiver.

14. A personal communications device according to claim 12 wherein the second radio receiver comprises a global positioning system (GPS) receiver.

15. A personal communications device according to claim 11 wherein at least one of the first value and the second value are generated using a principle of convergents of continued fractions.

16. A personal communications device according to claim 11 wherein the first memory area and the second memory area comprise at least one storage register.

17. A personal communications device according to claim 11 wherein the control signal generator further comprises:

multiplexer for selectively receiving the first and second storage values;

decrementing counter for receiving the value received by the multiplexer and decrementing the received value by a value of one in response to each pulse of the first clock signal to produce a decremented value, and outputting an enable signal once the decremented value reaches zero;

logic gating for receiving the first clock signal and the second clock signal and outputting an edge transition signal in accordance therewith upon receiving the input of the enable signal; and pulse generator for generating the control signal in accordance with the edge transition.

18. A communication device comprising:

first means for receiving a radio frequency signal that includes a first means for generating a first clock signal;

second means for receiving a radio frequency signal that includes a second means for generating a second clock signal;

means for storing first and second values representative of the first and second clock signals; and means for receiving one of the first and second values in response to the first clock signal and generating a control signal under control of the received value, counting pulses of the first and second clock signals and capturing the count of each clock signal in response to the control signal, and determining a ratio between the frequency of the first clock signal and the frequency of the second clock signal using the count.

19. A communications device according to claim 18, wherein the means for determining a ratio comprises:

first storage means for storing the first value;

second storage means for storing the second value;

means for generating the control signal comprising a first input for receiving the first value, a second input for receiving the second value, third input for receiving the first clock signal, a fourth input for receiving the second clock signal and an output for outputting the control signal in accordance with the values stored in the first and second storage means and the first and the second clock signals; and wherein the means for capturing count, captures values representative of the number of clock cycles of the first and the second clock signal that occur during a given time duration.

20. A personal communications device according to claim 18, wherein the first means for receiving a radio frequency signal comprises a code division multiple access (CDMA) based telecommunications receiver.

21. A communications device according to claim 18, wherein the second means for receiving a radio frequency signal comprises a global positioning system (GPS) receiver.

22. A communications device according to claim 19, wherein the control signal is generated where a transitional edge of the first clock signal coincides with and is in synchronization with a transitional edge of the second clock signal.

23. A communications device according to claim 22, wherein the means for means for generating a control signal comprises a controller.

24. A communications device according to claim 22, wherein the means for means for generating a control signal comprises an application specific integrated circuit.

25. A communications device according to claim 22, wherein the means for determining a ratio comprises an application specific integrated circuit.

26. A communications device comprising:

a first receiver that includes a first clock generating a first clock signal;

a second receiver that includes a second clock generating a second clock signal;

memory that stores values representative of the first and second clock signals; and a ratio counter that generates a control signal in accordance with one of the values, counts pulses of the first clock signal and the second clock signal and captures the count of each clock signal in response to the control signal, and determines a ratio between frequencies of the first and second clock signals using the count.

* * * * *